(12) United States Patent
Noyes (10) Patent No.: US 8,443,280 B2
(45) Date of Patent: May 14, 2013

(54) METHOD FOR SEQUENCED DOCUMENT ANNOTATIONS

(75) Inventor: Peter Noyes, Pasadena, CA (US)

(73) Assignee: Bluebeam Software, Inc.

( * ) Notice: Subject to any disclaimer, the term of this patent is extended or adjusted under 35 U.S.C. 154(b) by 544 days.

(21) Appl. No.: 12/638,875

(22) Filed: Dec. 15, 2009

(65) Prior Publication Data

US 2011/0145691 A1 Jun. 16, 2011

(51) Int. Cl.
*G06F 17/00* (2006.01)

(52) U.S. Cl.
USPC .......................................... 715/230; 715/233

(58) Field of Classification Search .................. 715/200, 715/230, 231–233
See application file for complete search history.

(56) References Cited

U.S. PATENT DOCUMENTS

| | | | |
|---|---|---|---|
| 6,859,909 B1 * | 2/2005 | Lerner et al. | 715/203 |
| 6,904,392 B1 * | 6/2005 | Marty et al. | 703/1 |
| 7,650,565 B2 * | 1/2010 | Ford, III | 715/230 |

* cited by examiner

*Primary Examiner* — Manglesh M Patel

(74) *Attorney, Agent, or Firm* — Stetina Brunda Garred & Brucker (57) ABSTRACT

A method for sequenced document annotation is disclosed. The method includes linking a first annotation to a document, where the first annotation is defined by a first primary graphic and a first sequence identifier. Thereafter, a first value is assigned to the first sequence identifier, and the first primary graphic and the first sequence identifier are displayed. After incrementing the first value to a second value, a second annotation is linked to the document. The second annotation is defined by a second sequence identifier and a second primary graphic identical to the first primary graphic. The second sequence identifier is assigned an incremented second value, and the second primary graphic and the second sequence identifier are displayed.

19 Claims, 7 Drawing Sheets

| | |
|---|---|
| TOOL TYPE ATTRIBUTE | 54 |
| PARAMETERS ATTRIBUTE | 56 |
| SEQUENCE IDENTIFIER | 68 |
| SEQUENCE STYLE ATTRIBUTE | 98 |
| PREFIX ATTRIBUTE | 100 |
| SUFFIX ATTRIBUTE | 102 |
| START ATTRIBUTE | 108 |
| INCREMENT ATTRIBUTE | 110 |
| INSTANCE IDENTIFIER | 120 |

METHOD FOR SEQUENCED DOCUMENT ANNOTATIONS

CROSS-REFERENCE TO RELATED APPLICATIONS

Not Applicable

STATEMENT RE: FEDERALLY SPONSORED RESEARCH/DEVELOPMENT

Not Applicable

BACKGROUND

1. Technical Field

The present disclosure generally relates to graphical user interfaces for managing annotations linked to electronic documents, and more particularly, to methods for sequenced document annotations.

2. Related Art

Advancements in high speed data communications and computing capabilities have increased the use of remote collaboration for conducting business. While real-time collaboration using videoconferencing and the like are gaining popularity, the vast majority of collaboration occurs over e-mail in the exchange of documents incorporating incremental modifications, comments, and the like. A local user may create an initial version of a document, and transmit the same to remotely located colleagues. These remote users may then make their own changes or add comments in the form of annotations appended to the document, and then transmit the new version back to the local user.

Such collaboration may involve the exchange of documents generated with word processing applications, desktop publishing applications, illustration/graphical image manipulation applications, Computer Aided Design (CAD) applications, and so forth. As utilized herein, the term "document" may refer to data produced by any of the aforementioned software applications. Furthermore, the term "content" may refer to data particular to the software application that generated it and stored in the document of the same. Due to the existence of many different computing platforms having a wide variety of operating systems, application programs, and processing and graphic display capabilities, it has been recognized by those in the art that a device-independent, resolution-independent file format was necessary to facilitate such exchange. In response to this need, the Portable Document Format (PDF), amongst other competing formats, has been developed.

The PDF standard is a combination of a number of technologies, including a simplified PostScript interpreter subsystem, a font embedding subsystem, and a storage subsystem. As those in the art will recognize, PostScript is a page description language for generating the layout and the graphics of a document. Further, per the requirements of the PDF storage subsystem, all elements of the document, including text, vector graphics, and raster (bitmap) graphics, collectively referred to herein as graphic elements, are encapsulated into a single file. The graphic elements are not encoded to a specific operating system, software application, or hardware, but are designed to be rendered in the same manner regardless of the specificities relating to the system writing or reading such data. The cross-platform capability of PDF aided in its widespread adoption, and is now a de facto document exchange standard. PDF has been released as an open standard published by the International Organization for Standardization (ISO) as ISO/IEC 3200-1:2008. Currently, PDF is utilized to encode a wide variety of document types, including those composed largely of text, and those composed largely of vector and raster graphics. Due to its versatility and universality, files in the PDF format are often preferred over more particularized file formats of specific applications. As such, documents are frequently converted to the PDF format.

A number of useful improvements have been made since the initial releases of PDF readers, writers, and the standard itself. One improvement that is particularly beneficial in a collaborative environment is the support for adding annotations to a base document. For example, a local user creates an initial version of a document, and transmits the same to distant colleagues. Thereafter, these remote users add their comments as annotations, and transmit the newly annotated versions of the document back to the local user for further revisions. Such annotation features are useful in a wide variety of collaborative settings, such as between a client and a service provider, within a corporate hierarchy, and so forth. It is noted that PDF is not the only document format incorporating collaboration features, and files generated by word processor, spreadsheet, and presentation applications such as Word, Excel, and PowerPoint, respectively, all from Microsoft Corp. of Redmond, Wash., also include the feature of adding annotations and tracking revisions.

From the user interface perspective, PDF documents are typically rendered as a static, graphical image, in which individual elements thereof such as text, pictures, and other elements are not editable. The aforementioned annotations are graphically overlaid or "placed" on the underlying document, with placement being precisely controlled by the user. Thus, the functionality is similar to graphic illustration/design and image manipulation applications where various objects can be positioned on a document canvas by navigating a cursor to a desired location and providing a subsequent input to make placement permanent. Prior to positioning the cursor, the object to be placed, such as a geometric primitive, a text box, or the like, is selected.

During the course of a typical workflow involving these types of applications, whether PDF annotation, graphic design, or image manipulation, numerous objects may be placed on the underlying document. In many cases, the same objects are reused in many different parts of the document, and hence have identical visual appearances. For example, an engineering drawing for a building may require multiple electrical outlets that may each be depicted with a common symbol placed at selected locations.

The use of identical graphics, however, notwithstanding its purpose in depicting identical elements, may result in confusion stemming from an inability to reference any particular one. Some graphical objects can include an editable text field within which additional descriptors may be inserted, and it is oftentimes desirable to sequence or associate a number to the graphics. Conventionally, if the text field of the graphical objects is to have a unique value, each one must be individually edited. Although multiple objects can be edited at once, the modifiable features are those that are common amongst the selected objects. Accordingly, there is a need in the art for an improved method for managing annotations, and for sequenced document annotation in particular.

BRIEF SUMMARY

In accordance with one embodiment set forth in the present disclosure, there is contemplated a method for sequentially annotating a document. The method may begin with a step of linking a first annotation to the document. The first annotation may be defined by a first primary graphic and a first sequence identifier. The method may also include a step of assigning a first value to the first sequence identifier, as well as a step of displaying the first primary graphic and the first sequence identifier on a workspace window. A step of incrementing the first value to a second value may be included, in addition to a step of linking a second annotation to the document. The second annotation may be defined by a second sequence identifier and a second primary graphic identical to the first primary graphic. Furthermore, the method may include assigning the second value to the second sequence identifier. There may also be a step of displaying the second primary graphic and the second sequence identifier on the workspace window. The present invention will be best understood by reference to the following detailed description when read in conjunction with the accompanying drawings.

BRIEF DESCRIPTION OF THE DRAWINGS

These and other features and advantages of the various embodiments disclosed herein will be better understood with respect to the following description and drawings, in which.

Common reference numerals are used throughout the drawings and the detailed description to indicate the same elements.

DETAILED DESCRIPTION

The detailed description set forth below in connection with the appended drawings is intended as a description of certain embodiments of the present disclosure, and is not intended to represent the only forms that may be developed or utilized. The description sets forth the various functions in connection with the illustrated embodiments, but it is to be understood, however, that the same or equivalent functions may be accomplished by different embodiments that are also intended to be encompassed within the scope of the present disclosure. It is further understood that the use of relational terms such as first and second and the like are used solely to distinguish one entity from another without necessarily requiring or implying any actual such relationship or order between such entities.

Figure 1:
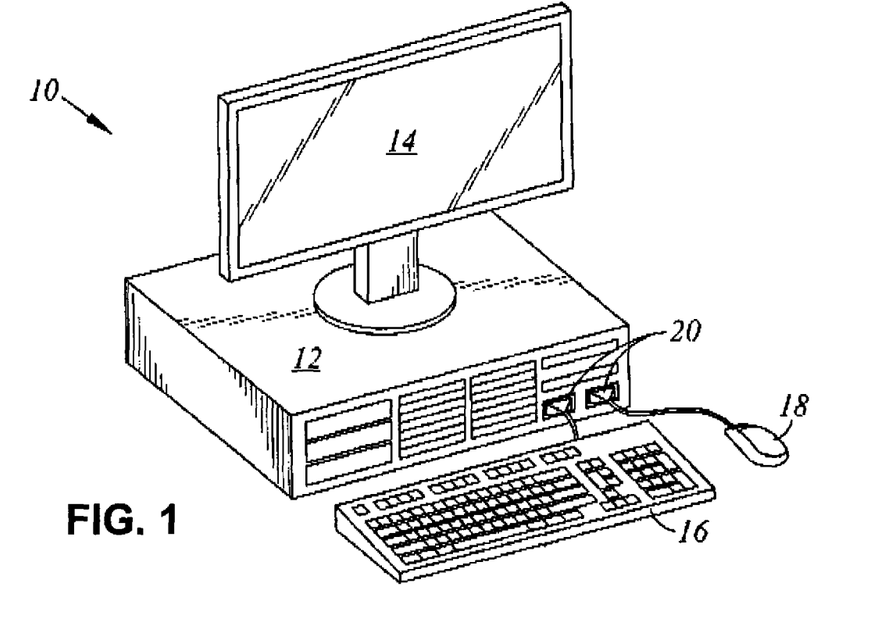
FIG. 1 is an exemplary computer system that may be capable to perform functions for use with aspects of the present invention including a display monitor.

With reference to FIG. 1, an exemplary hardware environment in which aspects of the present invention may be implemented includes a computer system 10 with a system unit 12 and a display monitor 14. The display monitor 14 graphically displays output from the data processing operations performed by the system unit 12. The display monitor 14 is a visual output device and includes some form of screen. The display monitor 14 may be of a Liquid Crystal Display (LCD) type, a Cathode Ray Tube (CRT) type, or any other suitable type of display. Devices such as a keyboard 16 and a mouse 18 provide input to the data processing operations, and are connected to the system unit 12 via USB ports 20. Various other input and output devices may be connected to the system unit 12, and alternative interconnection modalities may be substituted with the USB ports 20.

Figure 2:
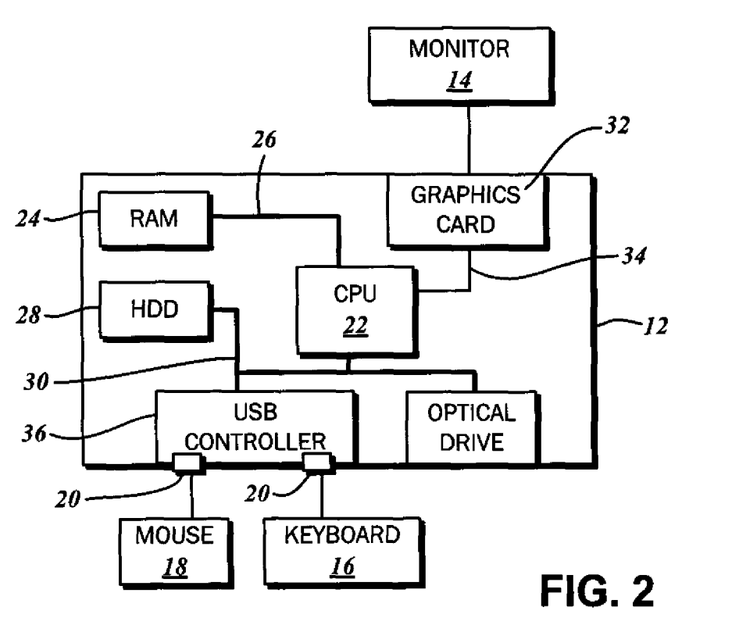
FIG. 2 is a block diagram of system components of the exemplary computer system of FIG. 1.

As shown in the block diagram of FIG. 2, the system unit 12 includes a Central Processing Unit (CPU) 22, which may represent one or more conventional types of such processors, such as an IBM PowerPC, Intel Pentium (x86) processors, and so forth. A Random Access Memory (RAM) 24 temporarily stores results of the data processing operations performed by the CPU 22, and is interconnected thereto typically via a dedicated memory channel 26. The system unit 10 may also include permanent storage devices such as a hard drive 28, which are also in communication with the CPU 22 over an input/output (I/O) bus 30. Other types of storage devices such as tape drives, Compact Disc drives, and the like may also be connected. A graphics card 32 is also connected to the CPU 22 via a video bus 34, and transmits signals representative of display data to the display monitor 14. As indicated above, the keyboard 16 and the mouse 18 are connected to the system unit 12 over the USB port 20. A USB controller 36 translates data and instructions to and from the CPU 22 for external peripherals connected to the USB port 20. Additional devices such as printers, microphones, speakers, and the like may be connected to the system unit 12.

The system unit 12 may utilize any operating system having a graphical user interface (GUI), such as WINDOWS from Microsoft Corporation of Redmond, Wash., MAC OS from Apple, Inc. of Cupertino, Calif., various versions of UNIX with the X-Windows windowing system, and so forth. The system unit 12 executes one or more computer programs, with the results thereof being displayed on the display monitor 14. Generally, the operating system and the computer programs are tangibly embodied in a computer-readable medium, e.g. one or more of the fixed and/or removable data storage devices including the hard drive 28. Both the operating system and the computer programs may be loaded from the aforementioned data storage devices into the RAM 24 for execution by the CPU 22. The computer programs may comprise instructions, which, when read and executed by the CPU 22, cause the same to perform or execute the steps or features of the various embodiments set forth in the present disclosure.

According to one embodiment, a user can interact with the system 10, specifically with the graphics being displayed on the monitor 14, via the mouse 18. The movement of a cursor generated on the monitor 14 is tied to the movement of the mouse 18, with further interactivity being provided with input from the mouse buttons. Input from the keyboard 16 also provides interactivity with the system 10. The following description refers to "clicking" the mouse buttons, "positioning" the cursor, "holding" the mouse button to "drag" an on-screen object, and so forth. It will be appreciated by those having ordinary skill in the art that such terms have well-understood meanings relative to interactions with the system 10 through a graphical user interface, and also find correspondence to other input modalities such as pen/digitizers and the like.

The foregoing computer system 10 represents only one exemplary apparatus suitable for implementing aspects of the present invention. As such, the computer system 10 may have many different configurations and architectures. Any such configuration or architecture may be readily substituted.

Figure 3:
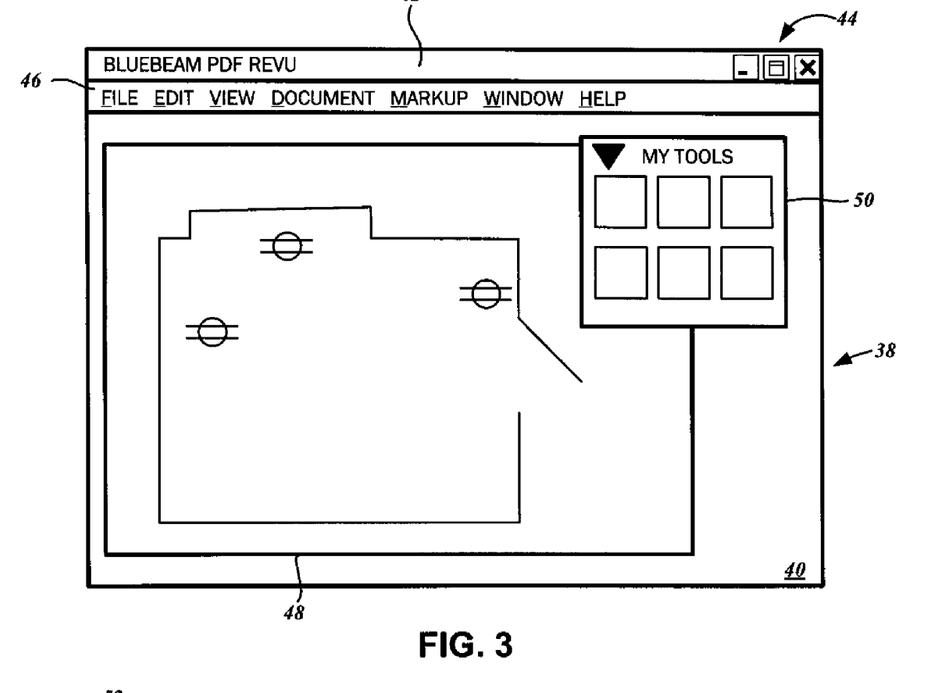
FIG. 3 is an exemplary graphical user interface of an application including a workspace window and a toolbox window, in which several embodiments of the present disclosure may be implemented.

FIG. 3 illustrates one exemplary graphical user interface 38 of a PDF reviewing software application in which various embodiments of the method for sequenced document annotation may be implemented. While various exemplary embodiments set forth below are described in relation to such a PDF reviewing software application, it will be appreciated that any other graphic manipulation software application may instead be substituted. As indicated above, the software application runs on a windowing system, and accordingly has a number of interface elements that are common to applications for the same.

In further detail, the functional, interactive features of the graphical user interface 38 are contained within a main window 40 that includes a title bar 42 with basic window controls 44. In addition, the main window 40 includes a menu bar 46, from which various functions of the reviewing software application may be invoked. Within the main window 40 is a workspace window 48, within which a document is rendered. In the example shown, the document is an architectural drawing comprised of a small variety of simple graphical elements including lines and arcs, though any other content such as text, raster images, and the like may also be included. Although in the exemplary embodiment the document is a PDF file structured in accordance with the standard as discussed above, it is expressly contemplated that any other suitable document format may be rendered in the workspace window 48.

Also within the main window 40 is a toolbox window 50 that displays an inventory of selected, most often used, or most recently used annotations, with further pertinent aspects thereto being described in greater detail below. In accordance with various embodiments, the toolbox window 50 is contemplated to have the functionality similar to that set forth in U.S. Pat. No. 7,600,193 to Gunderson, the disclosure of which is wholly incorporated by referenced herein.

Figure 4:
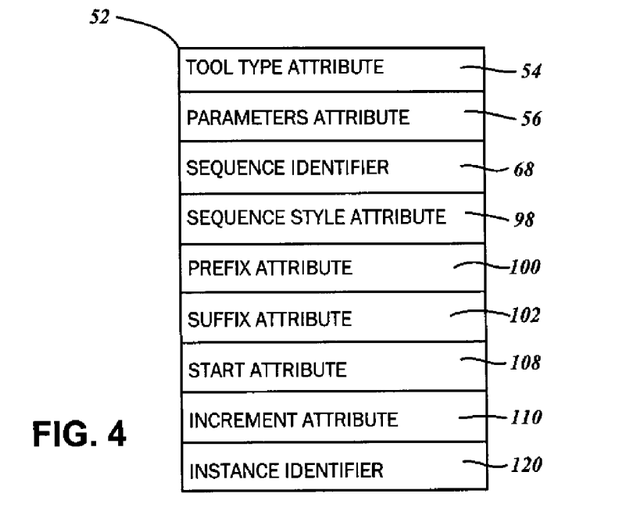
FIG. 4 is a block diagram illustrating exemplary attributes associated with an annotation or data object.

Annotations are understood to be a type of data object that is associated with an underlying document, and generally refers to a conceptual entity corresponding to a contiguous block of memory at a specific location and with a specific size, and is defined by one or more properties that define its characteristics. Referring to FIG. 4, an exemplary data object 52 includes a tool type attribute 54, and a parameters attribute 56.

It is understood that an annotation can be a geometric primitive such as a point, a line (single segment or multi-segment), an ellipse, a polygon, or the like, as well as specialized annotation object such as callout boxes. A "tool" therefore refers to such broad categories of objects, and so the tool type attribute associates the annotation as being a specific one of these categories. To further define the features of the annotation, the parameters attribute 56 can include the dimensions, color, line thickness, positioning coordinates, and other parameters that are specific to the tool type.

Figure 5:
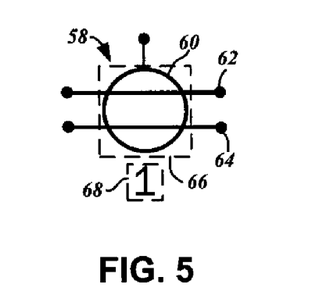
FIG. 5 is a graphical representation of an example electrical outlet annotation.

It is contemplated that multiple annotations or data objects can be combined into one, in which case the tool type attribute may have a value indicative of a group, with different parameter attributes 56 further defining the features of constituent objects. For example, as shown in FIG. 5, an electrical outlet annotation 58 is defined by a central ellipse 60, an upper intersecting line 62, and a lower intersecting line 64, each of which are geometric primitives as noted above. Each of these base objects is grouped into the single electrical outlet annotation 58. The particular data structure is presented by way of example only and not of limitation, and any other suitable data structure to represent the annotation may be substituted.

Figure 6:
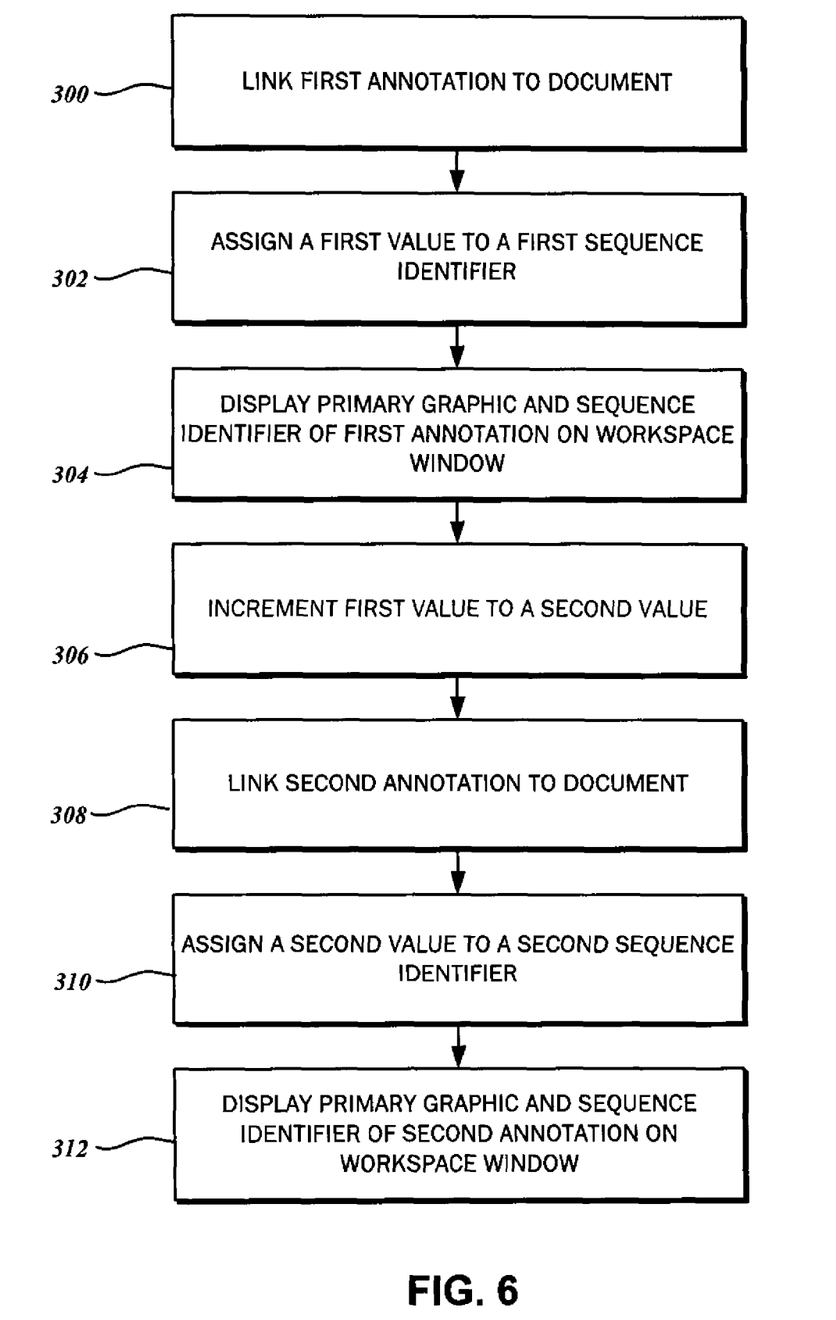
FIG. 6 is a flowchart illustrating the steps of a method for sequenced document annotation in accordance with one embodiment.

The flowchart of FIG. 6 sets forth a method for sequentially annotating a document in accordance with one embodiment of the present disclosure. Generally, a series of related annotations can be assigned a sequence identifier that is displayed with each one. The method includes a step 300 of linking a first annotation to the document. As indicated above, a given annotation or data object is defined by a tool type attribute 54 and a parameters attribute 56. Referring again to FIG. 5, however, the annotation 58 can be more generally characterized as being defined by a primary graphic 66 and a sequence identifier 68. The primary graphic 66 is comprised of the central ellipse 60, the upper intersecting line 62, and the lower intersecting line 64. It is understood that the sequence identifier 68 designates the specific instance of an annotation within a given sequence of annotations.

One exemplary way in which the annotation 58 is linked to the underlying document includes first placing the constituent elements on to the document, and then "selecting" the same. As shown in the screen capture of FIG. 7, the "edit" pull-down menu 70 includes a selectable option 72 referenced as "group," also accessible by the keyboard shortcut "ctrl-g," that is operative to combine each of the selected elements into one annotation 58. Feedback to the user to indicate that all of the desired elements have been selected is provided by way of control points surrounding each selected element. In addition to the foregoing, other ways of linking the annotation 58 to the document are also contemplated, such as pasting in an existing version from clipboard memory.

Figure 7:
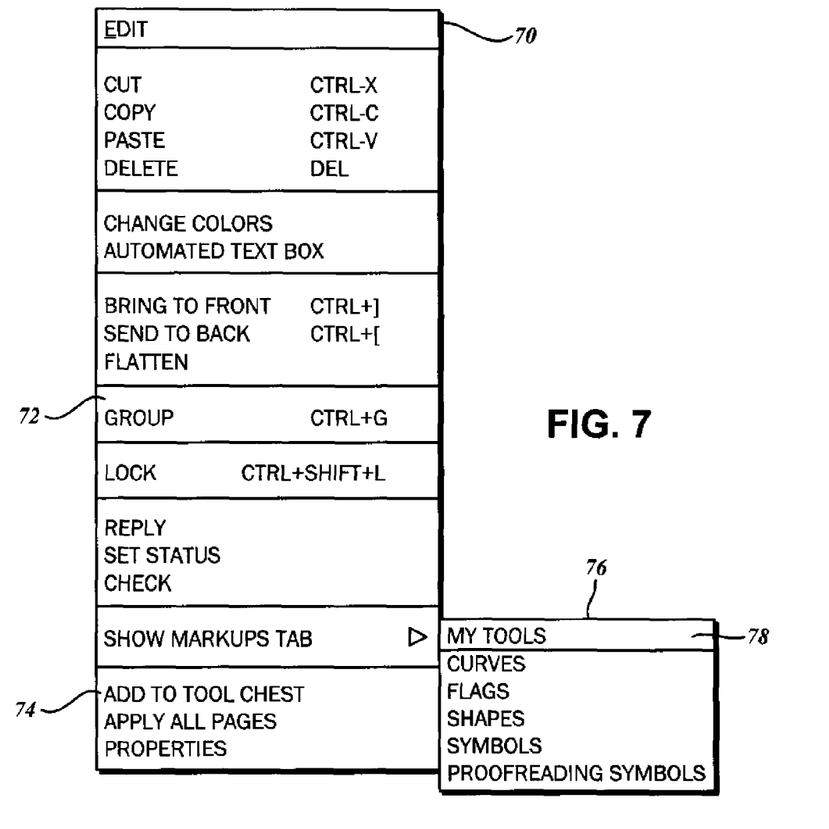
FIG. 7 is a detailed view of the graphical user interface showing the edit pull-down menu.
Figure 8:
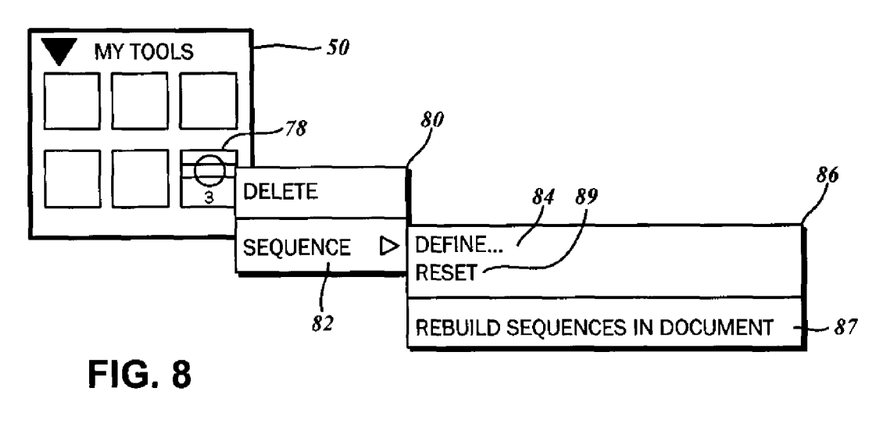
FIG. 8 is a detailed view of the toolbox window with a thumbnail of the example electrical outlet annotation.

Thereafter, so that the annotation 58 is available for selection from the inventory of annotations in the toolbox window 50, a selectable option 74 referred to as "add to tool chest" is clicked, in response to which a submenu 76 listing the various destination groups is displayed. As utilized herein, destination groups refer to the group of items displayed together on a single pane of the toolbox window 50. Although any of the destination groups can be selected as desired, for the purposes of the present example, the appropriate destination group is the "my tools" group selectable from submenu 76. FIG. 8 best illustrates a thumbnail 78 or secondary visual representation generated from the annotation 58 being displayed within the "my tools" group of the toolbox window 50 upon completion of this step, along with other annotations that have been previously placed therein.

Referring again to the flowchart of FIG. 6, the method continues with a step 302 of assigning the sequence identifier 68 a first value. Continuing with the above example, and with additional reference to FIG. 8, one way in which a sequence can be applied to the annotation 58 is by right-clicking the thumbnail 78 to activate a context sensitive menu 80 with a selectable option 82 referenced as "sequence." In response to selecting the option 82, another context sensitive sub-menu 84 is activated, including a selectable option 86 referenced as "define." Selection of option 86 is operative to activate a sequence definition screen 88, as further detailed in FIG. 9. Since the option to define the sequence was selected based upon activating the context sensitive menu 80 particular to the thumbnail 78, it is understood that the sequence is being defined with respect to the corresponding annotation 58. Besides the use of the toolbox window 50 to define sequences, other ways to activate the feature via other user interface elements are also contemplated.

Figure 9:
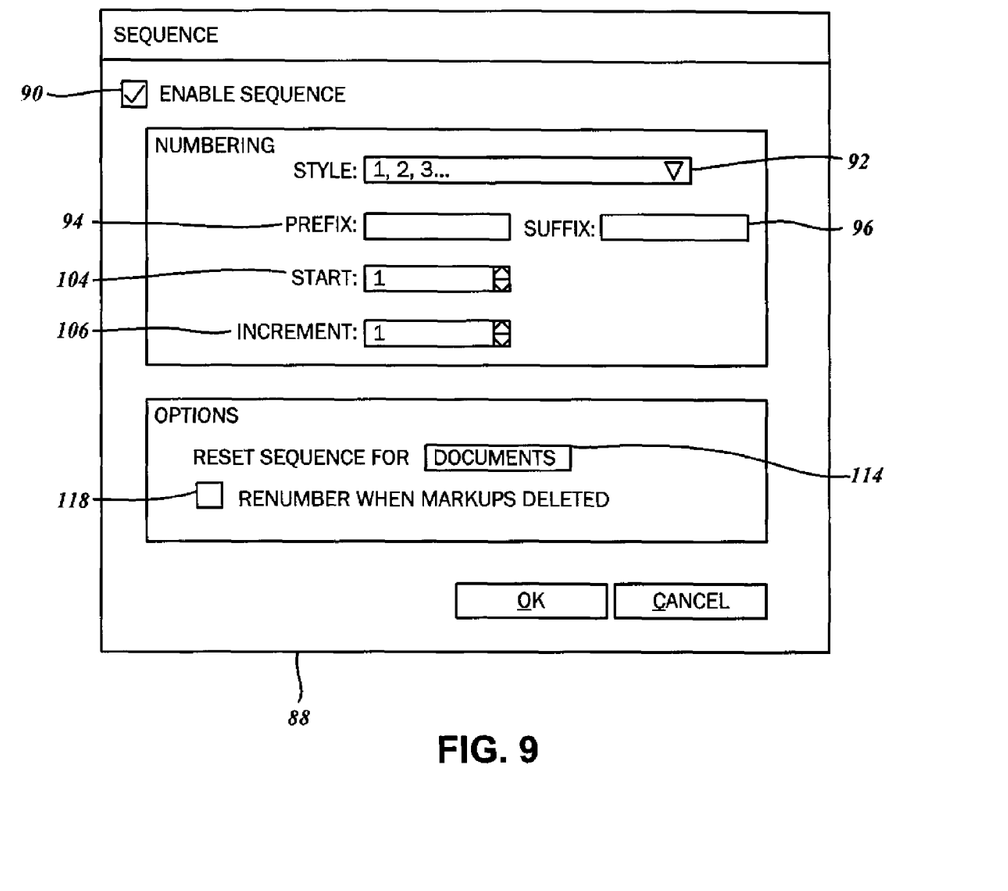
FIG. 9 is an exemplary sequence definition screen.

From the sequence definition screen 88, a variety of options of the sequence may be set. By selecting and deselecting a primary checkbox 90, sequencing is activated and deactivated, respectively. In one embodiment, it is contemplated that when the primary checkbox 90 is deselected, all of the other options in the sequence definition screen 88 are disabled or are inaccessible.

Via a numbering style pull-down menu 92, the format of the numbers of the sequence can be selected. For example, although the selection is defaulted to Arabic numerals, i.e., "1, 2, 3 . . . " alphabet character sequences such as "a, b, c . . . ." can also be utilized. Other enumerating sequences such as Roman numerals and capital and/or lower case versions of the foregoing can be selected. As shown in the data structure diagram of FIG. 4, the numbering style may be set in a sequence style attribute 98.

A prefix designation input 94 and a suffix designation input 96 are receptive to additional text that can be added before the sequence value and after the sequence value, respectively. Although the prefix and suffix text may be stored in separate fields, i.e., a prefix attribute 100 and a suffix attribute 102 that are separate from the sequence identifier 68, the values may be rendered in close physical proximity to each other. Furthermore, special tags may be entered in the prefix designation input 94 and the suffix designation input 96 that dynamically retrieve various properties of the file such as the file name, revision date, etc. that are generated in-line with the sequence identifier 68. Detailed examples of the way prefix and suffix text can be utilized will be discussed below. If, after placement of one more annotations of a sequence, it becomes necessary to modify any of the foregoing parameters, it is understood that a rebuild option 87 can be selected from the context sensitive menu 80 in order to propagate the modifications. One way for accessing the context sensitive menu 80 is described more fully above.

The start and increment values can also be adjusted via a first spinner box 104 and a second spinner box 106, respectively. The start value designates the number at which to being the sequence, and the increment value designates the value by which to increment the sequence identifier. Again, as shown in the data structure diagram of FIG. 4, the start value is stored in a start attribute 108 and the increment value is stored in an increment attribute 110. In accordance with one embodiment, the default setting for both the start and increment values is one, though user modification thereof via the spinner boxes 104, 106, or any other appropriate user interface element, is possible.

Figure 10:
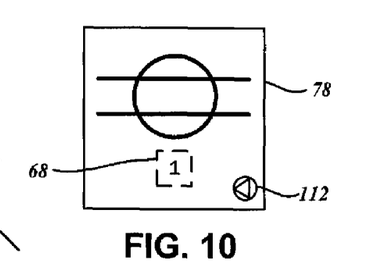
FIG. 10 is an exemplary thumbnail indicating that a sequence has been set in relation to its corresponding annotation.
Figure 11:
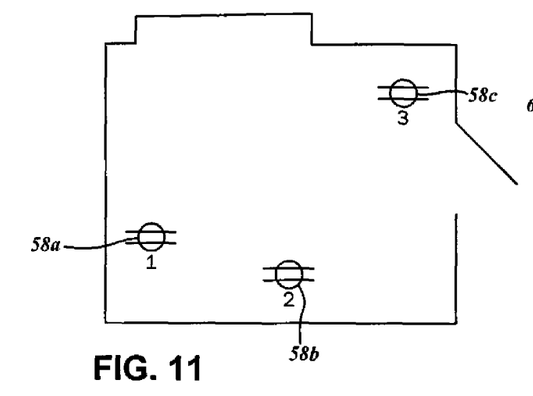
FIG. 11 is a detailed illustration of a first annotation, a second annotation and a third annotation each including respective sequence identifiers overlaid on a document rendered in the workspace window.

As best illustrated in FIG. 10, the thumbnail 78 generated on the toolbox window 50 includes an indicator 112 showing that a sequence has been defined with respect to the annotation 58. Referring again to the flowchart of FIG. 6, once the annotation 58 is linked to the document and assigned a sequence identifier value, the method continues with a step 304 of displaying the primary graphic 66 and the sequence identifier 68 on the workspace window 48. With reference to FIG. 11, which is a detailed view of the exemplary document, a first annotation 58a is placed thereon by any one of several well known-methods, including constructing the same from its constituent parts as described above, or by selecting the thumbnail 78, navigating the cursor to the desired location on the workspace window 48, and providing an input corresponding to an selection of that point. This input may be provided as a mouse click, a pen tap, or any other suitable interaction with the user. Then, a first value of 1 is assigned to its sequence identifier 68. In preparation for the next annotation of the same sequence, according to step 306, the first value is incremented to a second value based upon the increment attribute 110.

A second annotation 58b is then linked to the document per step 308. This typically involves again navigating the cursor to a desired location on the workspace window 48 and providing an input corresponding to a selection of that point. It is understood that the second annotation 58b has the same primary graphic 66 as that of the first annotation 58a. Additionally, the second annotation 58b is likewise defined by a second sequence identifier. In step 310, the second value, which is incremented from the first value, is assigned to the second sequence identifier. Then, in step 312, the second annotation 58b is displayed at the designated location on the document being rendered in the workspace window 48, and also shows the second sequence identifier, which by way of example, is 2.

Figure 12:
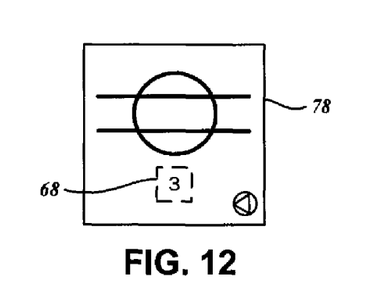
FIG. 12 is another variation of the exemplary thumbnail indicating the value of the sequence identifier that will be displayed in a newly placed third annotation.

At this point, the thumbnail 78 shows a third value of the sequence identifier that is incremented from the second value, to indicate what will be shown when the next annotation in the same sequence is linked to the document. Along these lines, the thumbnail 78 is understood to be a scaled representation of the same primary graphic 66 as that of the first annotation 58a and the second annotation 58b. As indicated above, there is a variety of different ways in which annotations can be placed on the document. In accordance with another embodiment, the thumbnail 78 is active and, when clicked, is operative to link a new annotation to the document, where the new annotation has the same primary graphic 66 as the corresponding annotation 58 depicted by the thumbnail 78. Continuing with the previous example, a newly placed third annotation 58c shows the incremented third sequence identifier, e.g., 3.

The continuity of the sequence of related annotations 58 may be varied, with the option being set via a reset parameter pull-down menu 114 of the sequence definition screen 88 shown in FIG. 9. One possible option is limiting the sequence to a single page, such that placing the annotation 58 on a different page of the document is operative to reset the sequence identifier 68 to its starting value. Upon returning to the page with an existing sequence, the next annotation added will have a sequence identifier value incremented from that of the last placed annotation (on that page). Another possible option is limiting the sequence to a single document, where annotations that are part of the same sequence spans multiple pages of the document. Similar to single page sequence resetting, once the user navigates to a document with an existing sequence, the next annotation placed anywhere on that document is assigned a sequence identifier value incremented from that of the last placed annotation.

Figure 13:
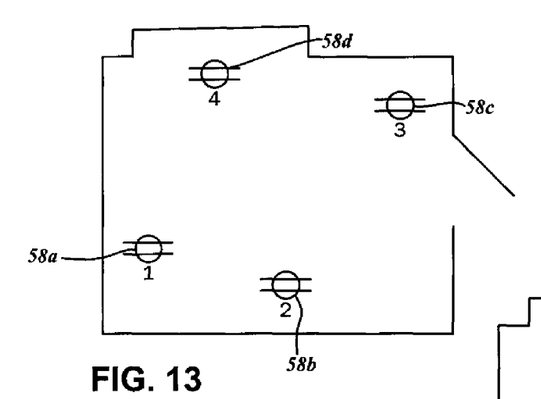
FIG. 13 illustrates a subsequent revision of the document shown in FIG. 11 including a fourth annotation.

Having considered the details of placing annotations on the document, a broader overview with an example sequence will be presented for a more comprehensible description of the automatic sequence resuming and annotation deletion features. The exemplary document of FIG. 11 depicts an initial version of the document that is created with a first annotation 58a, a second annotation 58b, and a third annotation 58c. After saving and closing this document, it may be desired to add a fourth annotation 58d, as shown in FIG. 13. As will be described in further detail below, it is possible for multiple sets of sequences to be defined within a page or a document, such that the numbering of annotations in one sequence advances independently of another sequence. However, in the present example, there is only one sequence, so upon opening the initial version, the sequencing resumes automatically and properly adjusts the sequence identifier 68 to 4.

Figure 14:
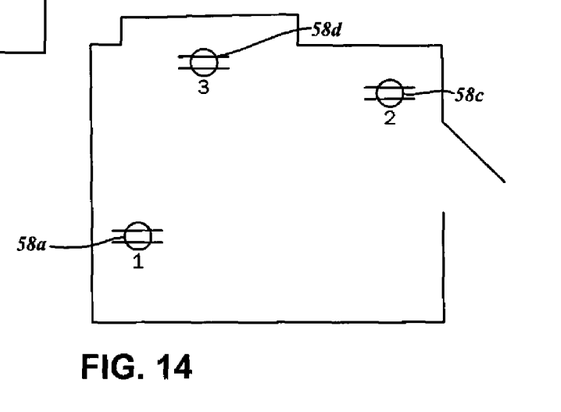
FIG. 14 illustrates a revision of the document shown in FIG. 13 with the second annotation removed and the previous third and fourth annotations being renumbered in accordance with one embodiment of the present invention.

Next, the deletion of one of the annotations of the sequence will be considered. By way of example, it may be desired to remove the second annotation 58b. In this case, the method continues with unlinking the second annotation 58b from the document by removing references thereto in memory. The display or workspace window 48 may be refreshed such that the second annotation 58b is no longer shown. In accordance with one embodiment of the present disclosure, at this point, it is possible for the other annotations in the sequence to be renumbered. In this regard, as shown in FIG. 14, the sequence identifier of the third annotation is renumbered to 2, and the sequence identifier of the fourth annotation is renumbered to 3

Figure 15:
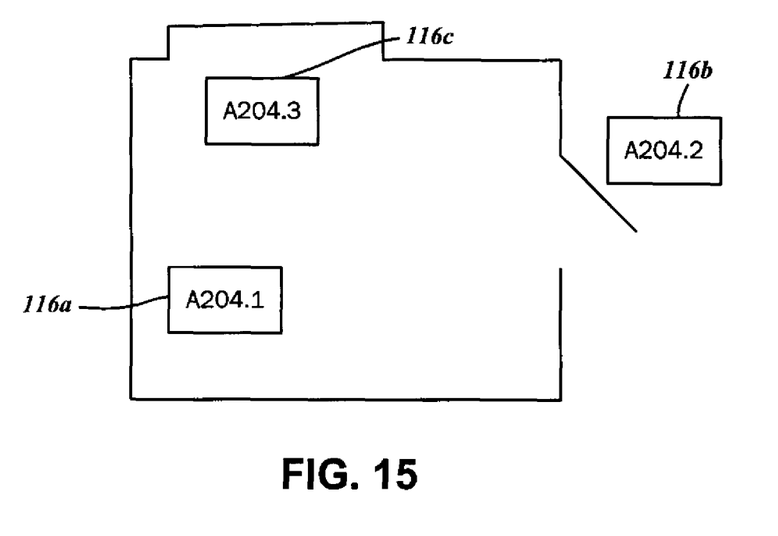
FIG. 15 is another exemplary document with a first annotation, a second annotation, and a third annotation each including respective sequence identifiers with prefixed text content.
Figure 16:
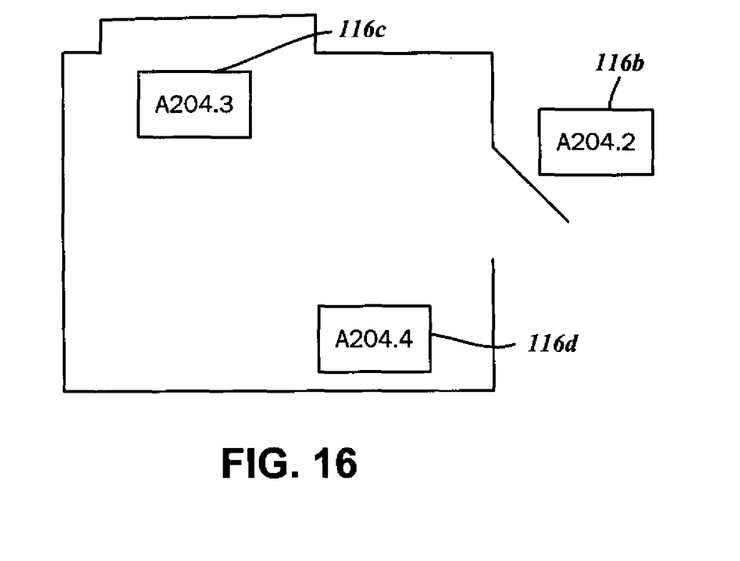
FIG. 16 is a subsequent revision of the document shown in FIG. 15 with the first annotation removed but without the subsequently added annotations being renumbered in accordance with another embodiment of the present invention.

Referring to FIGS. 15 and 16, another workflow setting may involve maintaining the number sequencing of the annotations even if intermediate annotations are removed from the document. For example, an architect may inspect a construction site to mark the location on the blueprints where flaws are identified, also known as "punch process." The architect may dictate details of the flaws into a voice recorder as the inspection progresses, and to do so effectively, it is understood that each markup can be uniquely referenced.

This example also contemplates the use of a custom prefix that derives its value from a property of the document, which may be stored as a document-wide variable called "DrawingNumber." The user may assign a value to the DrawingNumber variable. As noted above, the variable may be referenced from the prefix designation input 94 shown in the sequence definition screen 88 of FIG. 9. Specifically, an escape code, nominally the ampersand ("&") symbol, may be utilized, with the name of the variable enclosed within brackets, as such: &[DrawingNumber]. By way of example, the DrawingNumber variable is set to "A204".

Another example document shown in FIGS. 15 and 16 depicts a building plan with a variety of different features. As potential issues are noted, a particular sequence identifier may be recorded, and marked on the document as an annotation. In this way, a first annotation 116a designated as "A204.1" is added, followed by a second annotation 116b designated as "A204.2" and then a third annotation 116c designated as "A204.3". Later, it may be discovered that the first annotation 116a is no longer necessary, and removed as described above. In accordance with another embodiment, the remaining second annotation 116b and third annotation 116c are not renumbered, as shown in FIG. 16. The designator "A204.2" remains with the second annotation 116b, and the designator "A204.3" remains with the third annotation 116c, such that referential integrity is maintained with the aforementioned dictation. Subsequently adding a fourth annotation 116d involves incrementing the sequence identifier from the most recently placed third annotation 116c, and displays the same in conjunction with the predefined prefix and primary graphic.

Selection between the first mode of operation where deletion is followed by renumbering, and the second mode of operation where deletion is not followed by renumbering, is possible via the sequence definition screen 88. Specifically, there is provided a checkbox 118 with which the automatic renumbering feature can be activated and deactivated.

The foregoing examples presuppose that each of the annotations is part of the same sequence. As briefly noted above, it is expressly contemplated that multiple sets of sequences can be defined within a page or a document, such that the numbering of annotations in one sequence advances independently of another sequence. Each group of annotations that are part of the same sequence is referred to as an instance, and so each annotation or data object 52 is understood to include an instance identifier 120.

Adding another annotation to the document, regardless of whether it is part of a different instance or not, proceeds in essentially the same way as adding a second annotation described above. A third annotation defined by a third sequence identifier and a third primary graphic are linked to the document, and a third value is assigned to the third sequence identifier. Where the third annotation is part of the same instance as the first and second annotations, the instance identifier 120 therefor are identical. If, on the other hand, the third annotation is part of a different instance, it is assigned a different value for the instance identifier 120. In this regard, the third primary graphic may be identical to those of the first and second annotations, but in many cases, a different primary graphic may be utilized.

Individual thumbnails for the toolbox window 50 are generated for each instance, so that each instance is uniquely accessible. Considering that the thumbnails are secondary representations of the underlying primary graphic, different primary graphics between one instance and another help in readily distinguishing its corresponding thumbnails. Additionally, the subsequent values of the sequence identifiers 68 displayed in the thumbnails are also understood to be independent of one instance to another.

A new instance can be defined in the same manner described above in relation to creating a new annotation, but an existing instance can also serve as a basis for a new one. As best illustrated in FIG. 10, the thumbnail 78 includes an indicator 112 that is clickable to start a new instance using the same primary graphics. With reference again to FIG. 8, it is also possible to select a reset option 89 from the context sensitive sub-menu 84.

With regard to resuming the sequence where multiple instances are present, the particular annotation that is to be the basis of the selected sequence is manually selected. While present embodiments contemplate such manual control, certain default selections may be made, for example, the sequence can resume with the most recently used instance. It will be appreciated that any other criteria may be utilized to give priority to one instance over another.

The particulars shown herein are by way of example only for purposes of illustrative discussion, and are presented in the cause of providing what is believed to be the most useful and readily understood description of the principles and conceptual aspects of the various embodiments set forth in the present disclosure. In this regard, no attempt is made to show any more detail than is necessary for a fundamental understanding of the different features of the various embodiments, the description taken with the drawings making apparent to those skilled in the art how these may be implemented in practice.

What is claimed is:
1. A method for sequentially annotating a document, comprising:

linking a first annotation to the document, the first annotation being defined by a first primary graphic and is a part of a user-defined annotation sequence, a position within the annotation sequence being based upon a value of a first sequence identifier independent of the first primary graphic and associated with the first annotation;

assigning a first value to the first sequence identifier;

displaying the first primary graphic and the first sequence identifier on a workspace window;

incrementing the first value to a second value;

linking a second annotation to the document, the second annotation being defined by a second primary graphic identical to the first primary graphic, the second annotation being a part of the annotation sequence with another position within the annotation sequence being based upon a value of a second sequence identifier independent of the second primary graphic and associated with the second annotation;

assigning the second value to the second sequence identifier;

displaying the second primary graphic and the second sequence identifier on the workspace window;

linking a third annotation to the document, the third annotation being defined by a third primary graphic, the third annotation being a part of the annotation sequence with another position within the annotation sequence being based upon a value of a third sequence identifier independent of the third primary graphic and associated with the third annotation;

assigning a third value to the third sequence identifier;

displaying the third primary graphic and the third sequence identifier on the workspace window;

displaying on a toolbox window a secondary visual representation having a thumbnail image of the first and second primary graphics including the second sequence identifier incremented from the second value, the thumbnail image being associated with a user interface element for modifying sequences in the document; and displaying on the toolbox window a secondary visual representation having a thumbnail image of the third primary graphic and the third sequence identifier incremented from the third value;

wherein the first annotation, the second annotation, and the third annotation are each further defined by an instance identifier, the value of the instance identifier associated with the first and second annotations are different from the value of the instance identifier associated with the third annotation.

2. The method of claim 1, wherein the value of the instance identifier associated with the first, second and third annotations are the same.

3. The method of claim 1, wherein the third primary graphic is identical to the first and second primary graphics.

4. The method of claim 1, further comprising:

displaying on a toolbox window a secondary visual representation of the first, second and third primary graphics, the secondary visual representation including a fourth value of the sequence identifier incremented from the third value.

5. The method of claim 1, wherein the user interface element is a context menu for modifying sequences in the document.

6. The method of claim 1, wherein third primary graphic is different from the first and second primary graphics.

7. The method of claim 1, wherein the user interface element being for defining, resetting and rebuilding sequences in the document.

8. The method of claim 1, further comprising:

displaying on a toolbox window a secondary visual representation of the first and second primary graphics;

wherein the secondary visual representation includes a third value of the sequence identifier incremented from the second value.

9. The method of claim 8, further comprising:

receiving an input representative of a selection of the secondary visual representation;

wherein the third annotation is linked to the document in response to receiving the input representative of the selection of the secondary visual representation.

10. The method of claim 1, further comprising:

unlinking the first annotation from the document.

11. The method of claim 10, further comprising:

decrementing the second sequence identifier of the second annotation to the first value.

12. The method of claim 1, wherein the first annotation and the second annotation are each associated with a single page of the document.

13. The method of claim 1, wherein:

the first annotation is associated with a first page of the document; and the second annotation is associated with a second page of the document.

14. The method of claim 1, wherein the sequence identifier is alphabetical.

15. The method of claim 1, wherein the sequence identifier is numerical.

16. The method of claim 1, wherein the sequence identifier is incremented by a predefined value.

17. The method of claim 1, further comprising:

receiving the first value of the sequence identifier.

18. The method of claim 1, wherein the first annotation is further defined by a sequence suffix displayed with the sequence identifier in connection with the primary visual representation.

19. The method of claim 1, wherein the first annotation is further defined by a sequence prefix displayed with the sequence identifier in connection with the primary visual representation.

* * * * *